(12) United States Patent
Ikeda

(10) Patent No.: US 8,634,019 B2
(45) Date of Patent: Jan. 21, 2014

(54) IMAGE PROCESSING APPARATUS AND IMAGE PROCESSING METHOD

(71) Applicant: Canon Kabushiki Kaisha, Tokyo (JP)

(72) Inventor: Takeshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/666,857

(22) Filed: Nov. 1, 2012

(65) Prior Publication Data

US 2013/0057730 A1    Mar. 7, 2013

Related U.S. Application Data

(63) Continuation of application No. 12/955,703, filed on Nov. 29, 2010, now Pat. No. 8,345,151.

(30) Foreign Application Priority Data

Dec. 1, 2009   (JP) ................................. 2009-273890

(51) Int. Cl.
*H04N 9/68* (2006.01)
*H04N 5/235* (2006.01)
*H04N 5/222* (2006.01)
*H04N 5/228* (2006.01)

(52) U.S. Cl.
USPC ......... 348/362; 348/222.1; 348/234; 348/370

(58) Field of Classification Search
USPC ............... 348/222.1, 234–238, 360–366, 348/370–371; 396/63, 65, 89, 155, 161, 396/166, 167, 215
See application file for complete search history.

(56) References Cited

U.S. PATENT DOCUMENTS

| 4,395,099 | A | * | 7/1983 | Terasita | 396/50 |
| 4,929,824 | A | * | 5/1990 | Miyazaki | 382/274 |
| 5,049,997 | A | * | 9/1991 | Arai | 348/364 |
| 5,420,635 | A | * | 5/1995 | Konishi et al. | 348/362 |
| 5,831,676 | A | * | 11/1998 | Takahashi et al. | 348/362 |
| 6,950,141 | B2 | * | 9/2005 | Mori et al. | 348/362 |
| 7,023,484 | B2 | * | 4/2006 | Watanabe | 348/364 |
| 2006/0056835 | A1 | * | 3/2006 | Poon et al. | 396/310 |

* cited by examiner

*Primary Examiner* — Roberto Velez
*Assistant Examiner* — Tuan Le
(74) *Attorney, Agent, or Firm* — Canon USA Inc. IP Division

(57) ABSTRACT

An image processing apparatus includes a distribution detection unit configured to detect whether a luminance distribution on the screen changes to a hill-shaped form, based on a result of adding photometric values of each of divided photometry areas by rows and by columns, a difference calculation unit configured to calculate a luminance value difference between one portion of the screen and the peripheral portion thereof, a ratio calculating unit configured to calculate a ratio of pixels having a luminance value higher than or equal to a threshold value in the one portion, and a spotlight determination unit configured to determine whether a scene of the captured image is a spotlight scene according to a detection result of the distribution detection unit, calculation result of the difference calculation unit, and a calculation result of the ratio calculation unit.

7 Claims, 7 Drawing Sheets

FIG. 2A
| Ya0 | Ya1 | Ya2 | Ya3 |
|---|---|---|---|
| Ya4 | Ya5 | Ya6 | Ya7 |
| Ya8 | Ya9 | Ya10 | Ya11 |
| Ya12 | Ya13 | Ya14 | Ya15 |
FIG. 2B
FIG. 2C
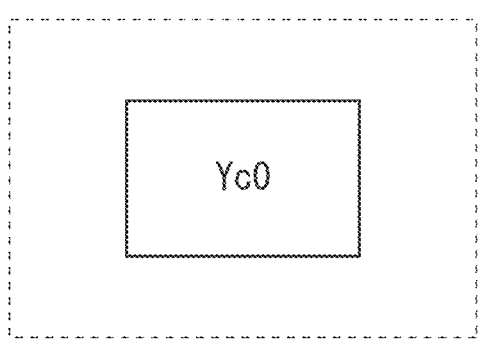
FIG. 2D
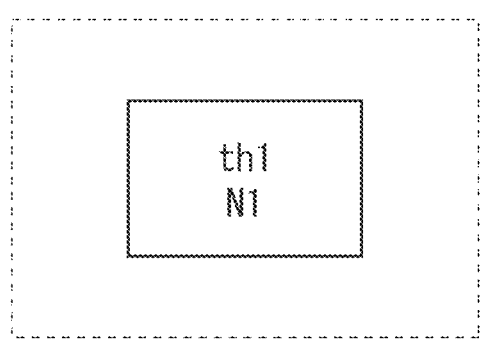

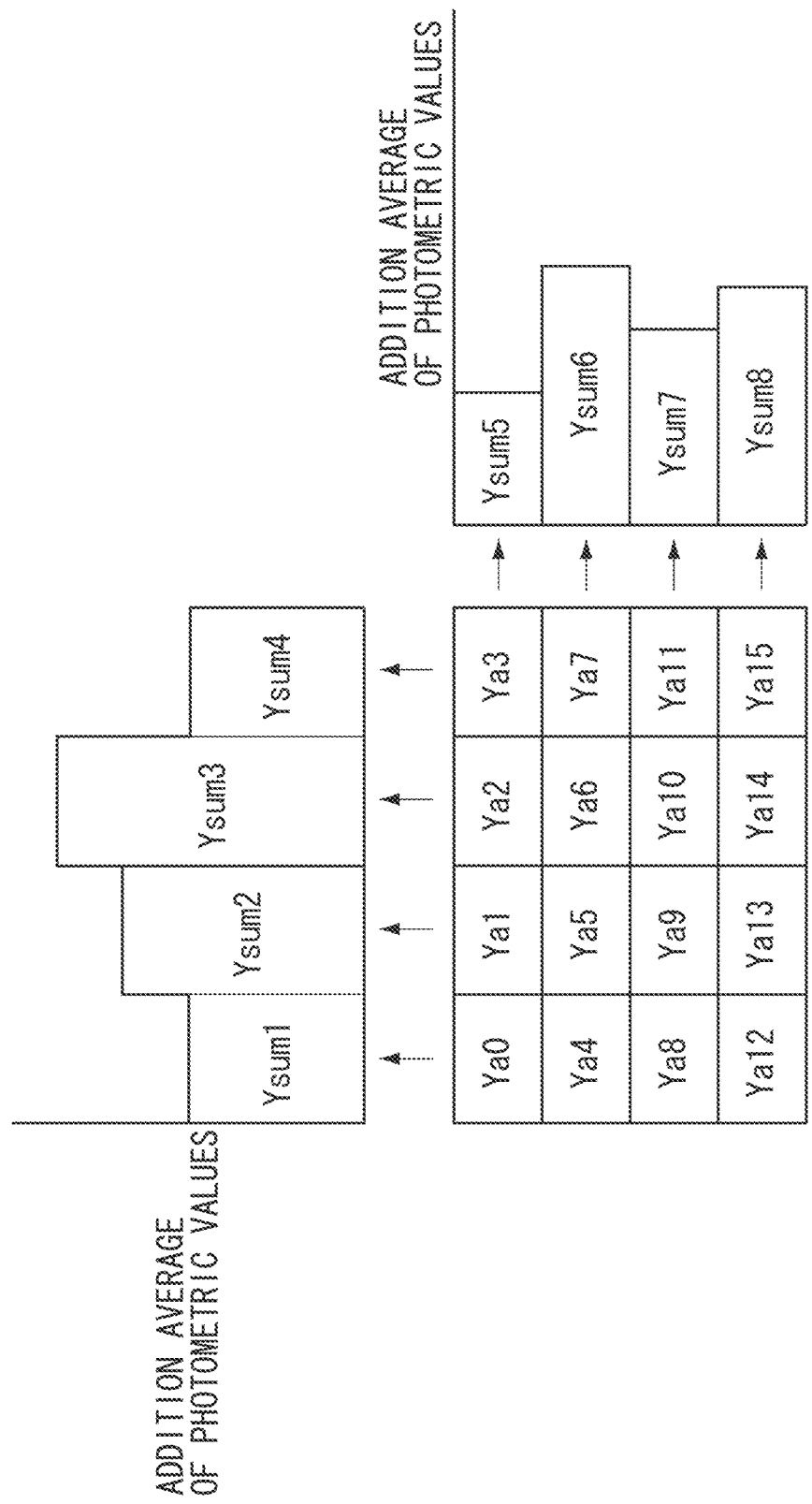

FIG. 5

|  |  |  |  |
|---|---|---|---|
|  |  |  |  |
|  |  | MAXIMUM LUMINANCE Y10 |  |
|  |  |  |  |

IMAGE PROCESSING APPARATUS AND IMAGE PROCESSING METHOD

This application is a continuation of application Ser. No. 12/955,703, filed on Nov. 29, 2010, which claims the benefit of Japanese Patent Application No. 2009-273890, filed Dec. 1, 2009, which are hereby incorporated by reference herein in their entirety.

BACKGROUND OF THE INVENTION

1. Field of the Invention

The present invention relates to automatic scene determination using an image captured by an image pickup apparatus such as a camera or a video camera.

2. Description of the Related Art

Conventionally, a user using an image pickup apparatus such as a video camera selects a scene mode that is appropriate for a captured scene. In such a case, a user who is familiar with a video camera can determine the scene mode that is appropriate for the scene currently being captured. However, a user who is not familiar with the video camera usually captures the image using an auto mode. Further, the user becomes fully occupied with tracking an object when capturing the image, even in the case where the user becomes familiar with the video camera and can determine the appropriate scene mode. The user is thus often too busy to switch between the modes when there is a sudden change in the scene. In particular, a scene which can be effectively captured in a spotlight mode is a scene in which the main object is overexposed, and if the user does not appropriately select the spotlight mode, information about the main object becomes lost. More specifically, in a case of a scene in which a newly wedded couple enters the room in a wedding ceremony by being spotlighted in the dark, the background becomes very dark and a center portion becomes very bright. As a result, if the user selects the auto mode to capture the image, the objects in the spotlight become overexposed.

Further, recent image pickup apparatuses have been capable of performing various types of automatic scene detection due to an improvement in the performance of an image processing integrated chip (IC) or a central processing unit (CPU). For example, Japanese Patent Application Laid-Open No. 05-056331 discusses an image pickup apparatus that detects the captured scene from a histogram and changes a weighting ratio in a light metering frame according to the detected scene. The main object thus becomes appropriately exposed in a scene in which the histogram is divided into a dark portion and a bright portion, such as the spotlight scene.

However, the image pickup apparatus discussed in Japanese Patent Application Laid-Open No. 05-056331 requires the user to determine the scene and switch the mode. Since the user is occupied with tracking the object or adjusting an angle of view, the user is unable to determine the scene and thus capture the image in the appropriate mode. Further, the camera discussed in Japanese Patent Application Laid-Open No. 05-056331 does not detect luminance distribution in a screen even when it automatically determines the scene, so that if the object is a black and white checkerboard pattern, the image pickup apparatus cannot correctly determine whether the scene is the spotlight scene. The image pickup apparatus thus performs light metering by focusing on the bright portion even in a normal scene which is not the spotlight scene. An undesirable image capturing result is thus acquired, in which the main object becomes underexposed.

The present invention is directed to automatically performing spot light scene determination with higher accuracy.

SUMMARY OF THE INVENTION

According to the present invention, an image processing apparatus which determines a scene of a captured image includes a first light metering unit configured to divide a screen of the captured image into a plurality of photometry areas and perform light metering, a second light metering unit configured to divide a screen of the captured image into one portion and a peripheral portion thereof and perform light metering, a distribution detection unit configured to detect whether a luminance distribution on the screen changes to a hill-shaped form, based on a result of adding photometric values of each of the photometry areas acquired by the first light metering unit by rows and by columns, a difference calculation unit configured to calculate a luminance value difference between the one portion and the peripheral portion thereof acquired by the second light metering unit, a ratio calculation unit configured to calculate a ratio of pixels having a luminance value higher than or equal to a threshold value in the one portion measured by the second light metering unit, and a spotlight determination unit configured to determine whether a scene of the captured image is a spotlight scene according to a detection result of the distribution detection unit, calculation result of the difference calculation unit, and a calculation result of the ratio calculation unit.

Further features of the present invention will become apparent from the following description of exemplary embodiments (with reference to the attached drawings).

BRIEF DESCRIPTION OF THE DRAWINGS

FIGS. 2A, 2B, 2C, and 2D illustrate light metering frames for acquiring photometric values according to an exemplary embodiment of the present invention.

FIG. 3 illustrates luminance distribution in a screen according to an exemplary embodiment of the present invention.

FIG. 5 illustrates a light metering frame for performing exposure control after detecting a scene according to an exemplary embodiment of the present invention.

DESCRIPTION OF THE EMBODIMENTS

Figure 1:
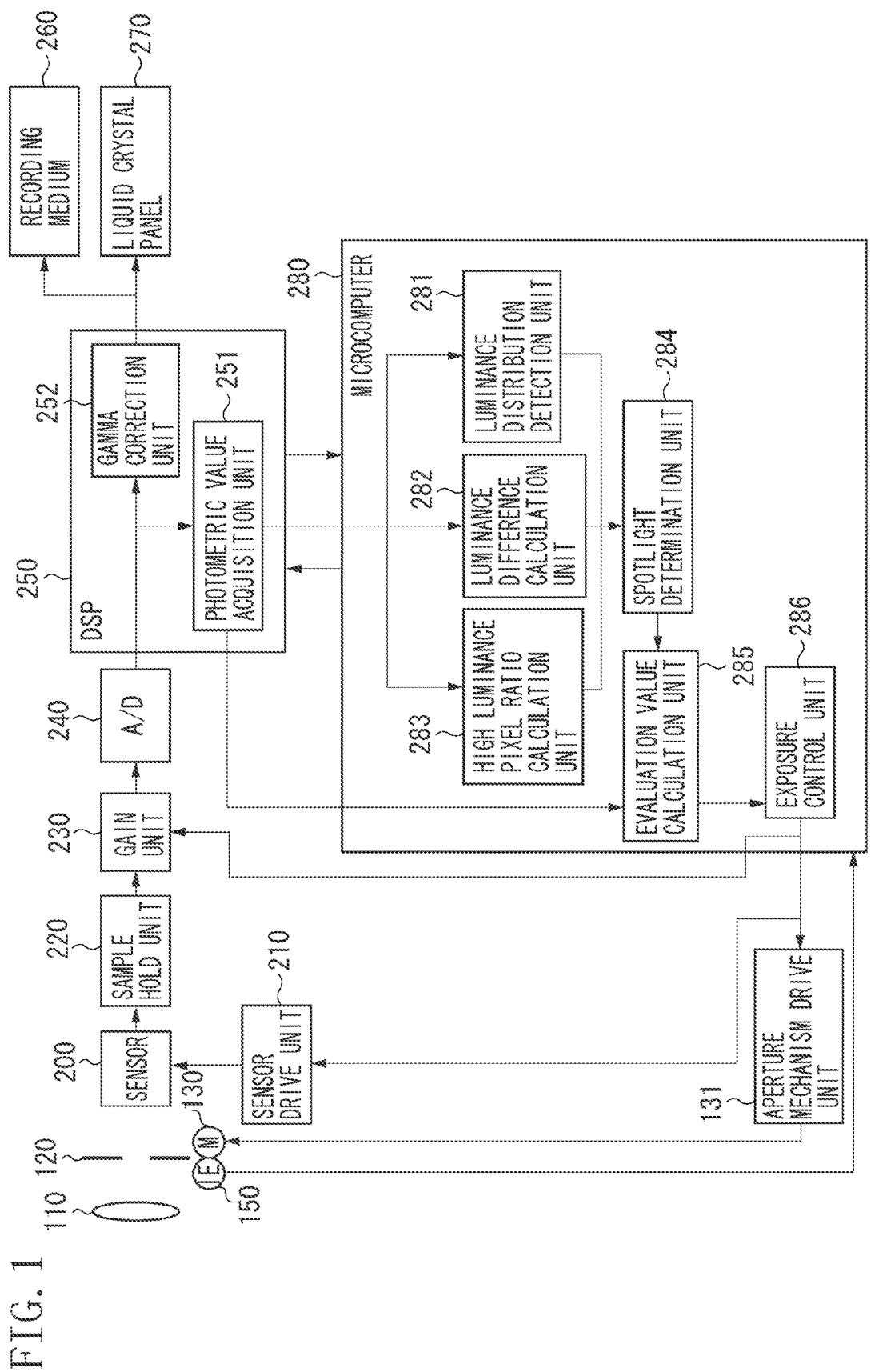
FIG. 1 is a block diagram illustrating a configuration of a digital video camera according to an exemplary embodiment of the present invention.

FIG. 1 is a block diagram illustrating a configuration of a digital video camera according to a first exemplary embodiment of the present invention. Referring to FIG. 1, an image forming lens 110 forms an image of the object. An aperture mechanism 120 controls quantity of incident light. An aperture drive motor 130 drives the aperture mechanism 120. An aperture mechanism drive unit 131 drives the aperture drive motor 130. An aperture position detection unit 150 detects a position of the aperture mechanism 120. A sensor 200 performs photoelectric conversion on the incident light. A sensor drive unit 210 controls the sensor 200 and reads a signal acquired by performing photoelectric conversion. Further, the sensor drive unit 210 controls an accumulation time of the signal (i.e., acts as an electronic shutter), and controls whether to read the signal by adding or not adding an electrical charge read out from the sensor or by performing sub-sampling. A sample hold unit 220 samples the signal to which the sensor 200 photoelectrically converted a signal. A gain unit 230 electrically amplifies an image signal output from the sample hold unit 220. An analog/digital conversion unit (A/D conversion unit) 240 converts an analog signal to a digital signal. An image processing unit (i.e., a digital signal processor (DSP)) 250 includes a control function for generating a standard television signal by adding a synchronization signal to the image signal on which processes such as color separation and color difference matrix have been performed after gamma correction. A recording medium 260 is capable of recording a moving image or a still image. A liquid crystal panel 270 displays the image. A microcomputer 280 issues a processing instruction to the DSP 250.

A photometric value acquisition unit 251 in the DSP 250 acquires a photometric value for each mesh frame obtained by dividing the screen into a plurality of areas, and a photometric value of an arbitrary area on the screen, or counts a number of pixels having a luminance value greater than or equal to, or less than or equal to a predetermined threshold value. There are various methods for acquiring the photometric value. According to the present exemplary embodiment, the photometric value is a value acquired as an addition average of luminance values of each of the pixels included in an area such as the divided frame. FIGS. 2A, 2B, 2C, and 2D illustrate frames set by a photometric value acquisition unit 251 for acquiring the photometric values. FIG. 2A illustrates a screen divided into a plurality of areas in a mesh form, and photometric values Ya0, Ya1, Ya2, Ya3, Ya4, Ya5, Ya6, Ya7, Ya8, Ya9, Ya10, Ya11, Ya12, Ya13, Ya14, and Ya15 can be acquired from each of the areas. FIG. 2B illustrates a light metering frame set to the entire screen, and a photometric value Yb0 can be acquired from the light metering frame. FIG. 2C illustrates the light metering frame set to the center portion (indicated by a solid line) of the screen (i.e., the entire screen indicated by a broken line), and a photometric value Yc0 can be acquired from the light metering frame. FIG. 2D illustrates the light metering frame set to the center portion (indicated by the solid line) of the screen (i.e., the entire screen indicated by the broken line). A number of pixels N1 indicating the number of pixels having a luminance value greater than or equal to a set luminance value can be acquired by setting a luminance threshold value th1 to the light metering frame illustrated in FIG. 2D.

Returning to FIG. 1, a luminance distribution detection unit 281 in the microcomputer 280 performs addition averaging of the photometric values for each row and each column of the areas in the mesh frame output from the photometric value acquisition unit 251. The luminance distribution detection unit 281 then detects the distribution of the luminance (luminance distribution) on the screen from the addition average results. A luminance difference calculation unit 282 in the microcomputer 280 calculates a difference between the luminance of the entire screen and the luminance of the center portion using the photometric values of the entire screen (refer to FIG. 2B) and of the center portion of the screen (refer to FIG. 2C) output from the photometric value acquisition unit 251. A high luminance pixel ratio calculation unit 283 in the microcomputer 280 calculates a ratio of high luminance pixels in the center portion of the screen using the number of pixels in the center portion of the screen having a luminance value greater than or equal to the threshold value (refer to FIG. 2D) output from the photometric value acquisition unit 251.

The above-described units in the DSP 250 and the microcomputer 280 include characteristic functions for determining the scene according to the present exemplary embodiment. Such units may be implemented as hardware, or a portion of the units may be implemented as software. In such a case, the CPU (not illustrated) in the DSP 250 and the microcomputer 280 perform the functions of each of the units as program modules according to each of the flowcharts to be described below.

Operations of the luminance distribution detection unit 281, the luminance difference calculation unit 282, and the high luminance pixel ratio calculation unit 283 in the microcomputer 280 will be described in detail below.

The luminance distribution detection unit 281 will be described below. The luminance distribution detection unit 281 can determine whether the luminance distribution on the screen is hill-shaped. The method for such determination will be described below.

The luminance distribution detection unit 281 performs addition averaging of the photometric values for each row and each column of the areas in the mesh frame output from the photometric value acquisition unit 251. FIG. 3 illustrates such a determination process. Referring to FIG. 3, the addition average results of the columns are illustrated above the mesh frame, and the addition average results of the rows are illustrated on the right side of the mesh frame. Each of the addition average results is obtained as illustrated in equation 1 described below.

$Y\text{sum}1=(Ya0+Ya4+Ya8+Ya12)/4$ $Y\text{sum}2=(Ya1+Ya5+Ya9+Ya13)/4$ $Y\text{sum}3=(Ya2+Ya6+Ya10+Ya14)/4$ $Y\text{sum}1=(Ya3+Ya7+Ya11+Ya15)/4$ $Y\text{sum}1=(Ya0+Ya1+Ya2+Ya3)/4$ $Y\text{sum}6=(Ya4+Ya5+Ya6+Ya7)/4$ $Y\text{sum}7=(Ya8+Ya9+Ya10+Ya11)/4$ $Y\text{sum}8=(Ya12+Ya13+Ya14+Ya15)/4$ (equation 1)

The luminance distribution detection unit 281 then searches for a maximum photometric value among the columns of Ysum1, Ysum2, Ysum3, and Ysum4. In the example illustrated in FIG. 3, Ysum3 is the maximum photometric value. The luminance distribution detection unit 281 thus stores in a memory (not illustrated) in the microcomputer the Ysum3 as Ymax, i.e., the maximum photometric value among the columns. The luminance distribution detection unit 281 then refers to the value Ysum2 on the left side of the column of Ysum3 having the maximum photometric value. The luminance distribution detection unit 281 determines that Ysum3>Ysum2. Ysum 2 is thus currently a minimum photometric value, and the luminance distribution detection unit 281 stores in a memory (not illustrated) in the microcomputer the Ysum2 as Ymin, i.e., the minimum photometric value. Further, the luminance distribution detection unit 281 refers to the value Ysum1 on the left side of the column of Ysum2. The luminance distribution detection unit 281 determines that Ysum2>Ysum1. Ysum 1 is thus currently the minimum photometric value, and the luminance distribution detection unit 281 stores in a memory (not illustrated) in the microcomputer the Ysum1 as Ymin, i.e., the minimum photometric value. Since there is no column on the left side of Ysum1, it can be determined that there is no rise and fall in the luminance from the column of Ysum3 to the column of Ysum1, and the photometric value is continuously decreasing. The columns on the right side of the column of Ysum3 are similarly processed. The luminance distribution detection unit 281 refers to the value Ysum4 on the right side of the column of Ysum3. The luminance distribution detection unit 281 determines that Ysum3>Ysum4. Ysum 4 is thus currently the minimum photometric value, and the luminance distribution detection unit 281 stores the Ysum41 as Ymin in a memory (not illustrated) in the microcomputer. Since there is no column on the right side of Ysum4, it can be determined that there is no rise and fall in the luminance from the column of Ysum3 to the column of Ysum4, and the photometric value is continuously decreasing. As a result, it can be determined that the luminance distribution in a horizontal direction is hill-shaped with the column of Ysum3 at the center.

The luminance distribution detection unit 281 then searches for a maximum photometric value from rows of Ysum5, Ysum6, Ysum7, and Ysum8. In the example illustrated in FIG. 3, Ysum6 has the maximum photometric value. The luminance distribution detection unit 281 thus stores in a memory (not illustrated) in the microcomputer the Ysum3 as Ymax, i.e., the maximum photometric value among the rows. The luminance distribution detection unit 281 then refers to the value Ysum7 below the row of Ysum6 having the maximum photometric value. The luminance distribution detection unit 281 determines that Ysum6>Ysum7. Ysum7 is thus currently a minimum photometric value, and the luminance distribution detection unit 281 stores the Ysum7 as Ymin in a memory (not illustrated) in the microcomputer. Further, the luminance distribution detection unit 281 refers to the value Ysum8 below the row of Ysum7. The luminance distribution detection unit 281 determines that Ysum8>Ysum7. Since Ysum8 is greater than the stored Ymin, the luminance distribution detection unit 281 stores in the microcomputer a difference between the photometric values (Ydiff=Ysum8−Ymin). Further, since the Ysum7 is still the current minimum photometric value, the Ymin is not updated. There is no row under Ysum8, and Ydiff is not 0, so that there is a rise and fall in the luminance from the row of Ysum6 to the row of Ysum8. At this stage, the luminance distribution in a vertical direction of the screen may not be hill-shaped. The row above the row of Ysum6 is similarly processed. The luminance distribution detection unit 281 refers to the value Ysum5 below the row of Ysum6. The luminance distribution detection unit 281 determines that Ysum6>Ysum5. Ysum5 is thus currently a minimum photometric value, and the luminance distribution detection unit 281 stores the Ysum5 as Ymin in a memory (not illustrated) in the microcomputer. Since there is no row above Ysum5, it can be determined that there is no rise and fall in the luminance from the row of Ysum6 to the row of Ysum5, and the photometric value is continuously decreasing. If the value of Ydiff is greater than 0, the luminance distribution in a vertical direction of the screen may be determined to be hill-shaped when the value of Ydiff is less than or equal to 10% of a sum of the addition average photometric values (Ysum_sum=Ysum5+Ysum6+Ysum 7+Ysum8).

Figure 4:
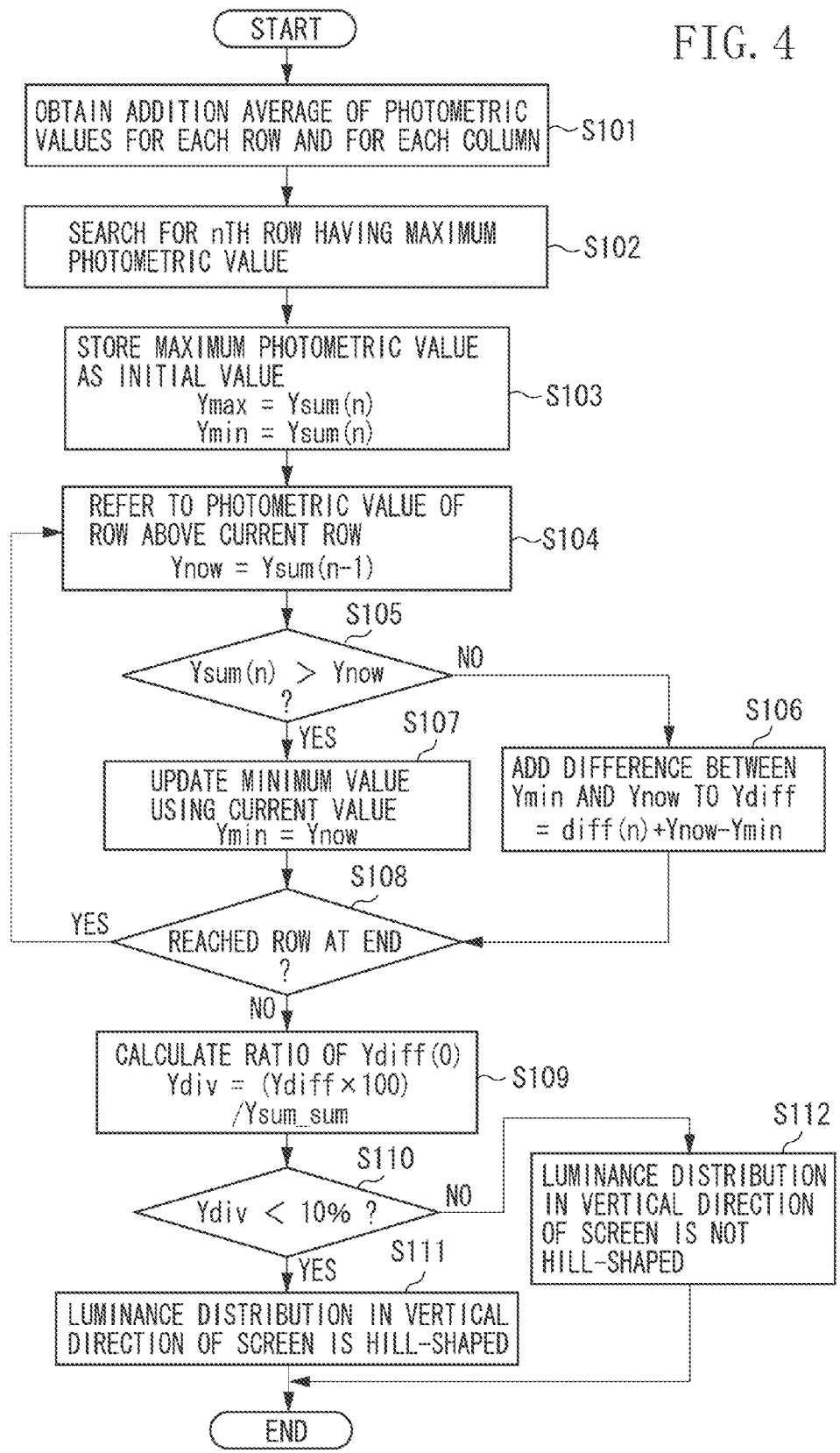
FIG. 4 is a flowchart illustrating a process for determining luminance distribution according to an exemplary embodiment of the present invention.

As a result of performing the above-described calculation, it can be determined that the luminance distribution in the rows and columns, i.e., the horizontal and vertical directions of the screen, are hill-shaped, so that the luminance distribution of the entire screen is hill-shaped. The above-described process will be described below with reference to the flowchart illustrated in FIG. 4.

In step S101, the luminance distribution detection unit 281 performs addition averaging of the photometric values output from the mesh frame for each row, and the process then proceeds to step S102. In step S102, the luminance distribution detection unit 281 searches for the row having the maximum photometric value among the plurality of addition average photometric values obtained in step S101. In the example illustrated in FIG. 4, such a row is assumed to be the nth row. The maximum value is thus set as Ysum(n). In step S103, the luminance distribution detection unit 281 stores the value of the nth row having the maximum photometric value Ysum(n) as an initial value in Ymax and Ymin (i.e., Ymax=Ymin=Ysum(n)). In step S104, the luminance distribution detection unit 281 obtains the addition average of the photometric values in n−1th row which is one row above the nth row and stores the value as a current value Ynow (i.e., Ynow=Ysum(n−1)). The process then proceeds to step S105. In step S105, the luminance distribution detection unit 281 compares the addition averages of the photometric values in the nth row and in the n−1th row, i.e., Ysum(n) and Ysum(n−1). If Ysum(n) is greater than Ysum(n−1) (Yes in step S105), the process proceeds to step S107. On the other hand, if Ysum(n) is greater than Ysum(n−1) (No in step S105), the process proceeds to step S106. In step S106, the luminance distribution detection unit 281 adds the difference between Ymin and Ynow to Ydiff (i.e., Ydiff(n−1)=Ydiff(n)+Ynow−Ymin). The process then proceeds to step S108. In step S107, the luminance distribution detection unit 281 updates the minimum value using the current value (i.e., Ymin=Ynow). The process then proceeds to step S108. In step S108, the luminance distribution detection unit 281 determines whether it has reached the row at an end. If the row is not at the end (NO in step S108), the process returns to step S104. If it has reached the row at the end (Yes in step S108), the process proceeds to step S109. If the process returns to step S104, the luminance distribution detection unit 281 moves to the row above the current row and repeats the process until the luminance distribution detection unit 281 determines that it has reached the row at the end. In step S109, the luminance distribution detection unit 281 obtains a ratio of Ydiff(0) which is a result of continuously adding the difference in step S106 to the sum of the addition average photometric values of each of the rows Ysum_sum (i.e., (Ydiv=(Ydiff*100)/Ysum_sum). The process then proceeds to step S110. In step S110, the luminance distribution detection unit 281 determines whether the result calculated in step S109 is less than or equal to a predetermined value (e.g., 10%). If the result is less than 10% (YES in step S110), the process proceeds to step S111. If the result is greater than or equal to 10% (NO in step S110), the process proceeds to step S112.

In step S111, the luminance distribution detection unit 281 determines that the luminance distribution in the vertical direction of the screen is hill-shaped. In step S112, the luminance distribution detection unit 281 determines that the luminance distribution in the vertical direction of the screen is not hill-shaped. The process then ends.

The above-described flowchart determines the shape of the luminance distribution starting from the maximum photometric value of the row to an upper direction of the rows. The luminance distribution of the entire screen is determined to be hill-shaped if similar flows performed to a lower direction of the rows, and in both directions of the columns, all have reached step S111. If at least one of the flows reaches step S112, it is determined that the luminance distribution of the entire screen is not hill-shaped.

As described above, the luminance distribution detection unit 281 determines whether the luminance distribution of the screen is hill-shaped, which is a first condition for determining the spotlight scene.

The operation of the luminance difference calculation unit 282 will be described below. The luminance difference calculation unit 282 calculates the difference between the luminance of the center portion of the screen and the entire screen, and determines whether the captured image of the object is the spotlight scene. FIG. 2B illustrates the light metering frame set to the entire screen, from which the photometric value Yb0 is output. Further, FIG. 2C illustrates the light metering frame set to the center of the screen, from which the photometric value Yc0 is output. A luminance difference is calculated using a ratio between Yc0 and Yb0, as illustrated in Equation 2. If the photometric value of the center portion is brighter than the photometric value of the entire screen by 2 Ev or more, (i.e., four or more times brighter), it satisfies a second condition for determining the spotlight scene.

$$Yratio = Yc0/Yb0, Yratio > 2.0 \quad \text{(Equation 2)}$$

It is not necessary to fix at the center of the screen, the light metering frame which is set to the center portion of the screen. The luminance difference calculation unit 282 may set a size of the frame in which a peak point in the screen detected by the luminance distribution detection unit 281 is at the center. The spotlight mode can more accurately be determined by associating the light metering frame with the peak point on the screen detected by the luminance distribution detection unit 281.

The operation of the high luminance pixel ratio calculation unit 283 will be described below. The high luminance pixel ratio calculation unit 283 determines the number of high luminance pixels to be corrected in the center portion of the screen and determines whether the captured object is the spotlight scene. FIG. 2D illustrates the light metering frame set in the center portion of the screen. According to the present exemplary embodiment, the light metering frame illustrated in FIG. 2D is set to be in the same position and at the same size as FIG. 2C. Since the center portion of the screen is brighter than the peripheral portion of the screen in the spotlight scene and includes the bright object which is to be corrected to become dark, the light metering frames illustrated in FIGS. 2C and 2D are set as described above. However, it is not necessary that the light metering frames match each other. For example, a similar effect can be acquired when the frame set in FIG. 2D is smaller than the frame set in FIG. 2C. Further, it is not necessary that the light metering frame is fixed at the center portion of the screen. The high luminance pixel ratio calculation unit 283 may set a size of the frame in which the peak point in the screen detected by the luminance distribution detection unit 281 is at the center. The spotlight mode can be more accurately determined by associating the light metering frame with the peak point on the screen detected by the luminance distribution detection unit 281.

The high luminance pixel ratio calculation unit 283 sets a luminance threshold value Th1 to the light metering frame at the center portion of the screen, counts the pixels whose luminance values exceed the threshold value Th1, and stores the number of such pixels N1 in a memory (not illustrated) in the microcomputer 280. For example, the threshold value may be set to a level which is greater than or equal to 100 IRE in which overexposure is almost caused. Further, the number of pixels (NO) in the light metering frame at the center portion is previously acquired when setting the size of the frame. The ratio of the number of pixels whose luminance value is 100 IRE or more, i.e., almost overexposed, to the number of pixels in the light metering frame at the center portion of the screen can be expressed as in equation 3.

$$Nratio = N1*100/NO \quad \text{(equation 3)}$$

If the ratio Nratio exceeds 30%, it becomes a third condition for determining the spotlight scene.

Figure 5:
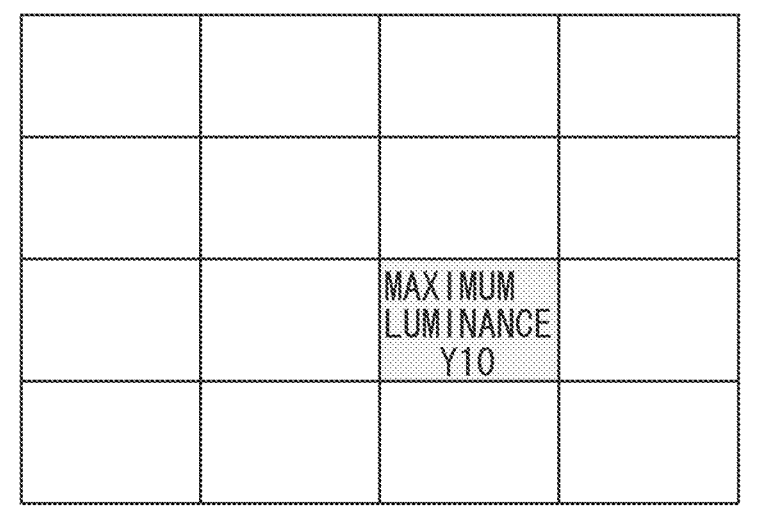

As described above, the output from the luminance distribution detection unit 281 as the first condition, the output from the luminance difference calculation unit 282 as the second condition, and the output from the high luminance pixel ratio calculation unit 283 as the third condition are input to the spotlight determination unit 284. If all of the conditions indicate the scene as the spotlight scene, the spotlight determination unit 284 determines that the currently captured scene is the spotlight scene. As a result, the spotlight determination unit 284 in the microcomputer 280 illustrated in FIG. 1 instructs an evaluation value calculation unit 285 in the microcomputer 280 to switch the light metering method to a peak light metering method. The peak light metering method changes the exposure so that a maximum luminance portion Y10 illustrated in FIG. 5 within the photometry area (e.g., a divided area similar to FIG. 2A) in the screen becomes a predetermined target value. The evaluation value calculation unit 285 then performs peak light metering and calculates the evaluation value. The evaluation value calculation unit 285 inputs the calculated evaluation value to an exposure control unit 286 in the microcomputer 280 to instruct the aperture mechanism drive unit 131, the sensor drive unit 210, and the gain 230 to perform automatic exposure (AE). The result of performing the AE is then again input to the photometric value acquisition unit 251, so that the photometric value is output to the evaluation value calculation unit 285. The evaluation value calculation unit 285 again calculates the evaluation value of the peak light metering, and IRIS, the shutter and the gain are operated until an appropriate evaluation value is acquired.

Figure 6A:
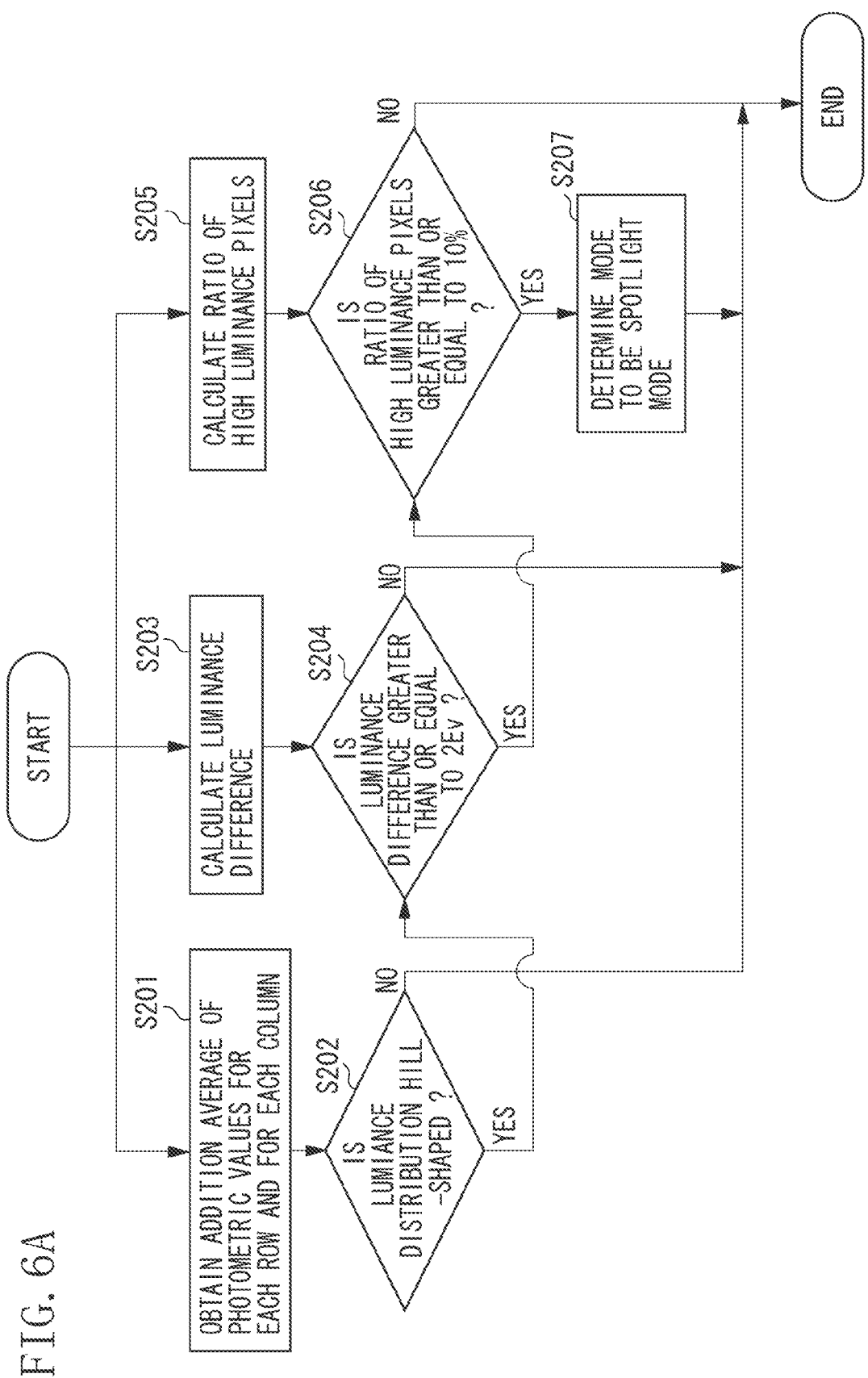
FIGS. 6A and 6B are flowcharts illustrating a process for controlling scene determination according to an exemplary embodiment of the present invention.
Figure 6B:
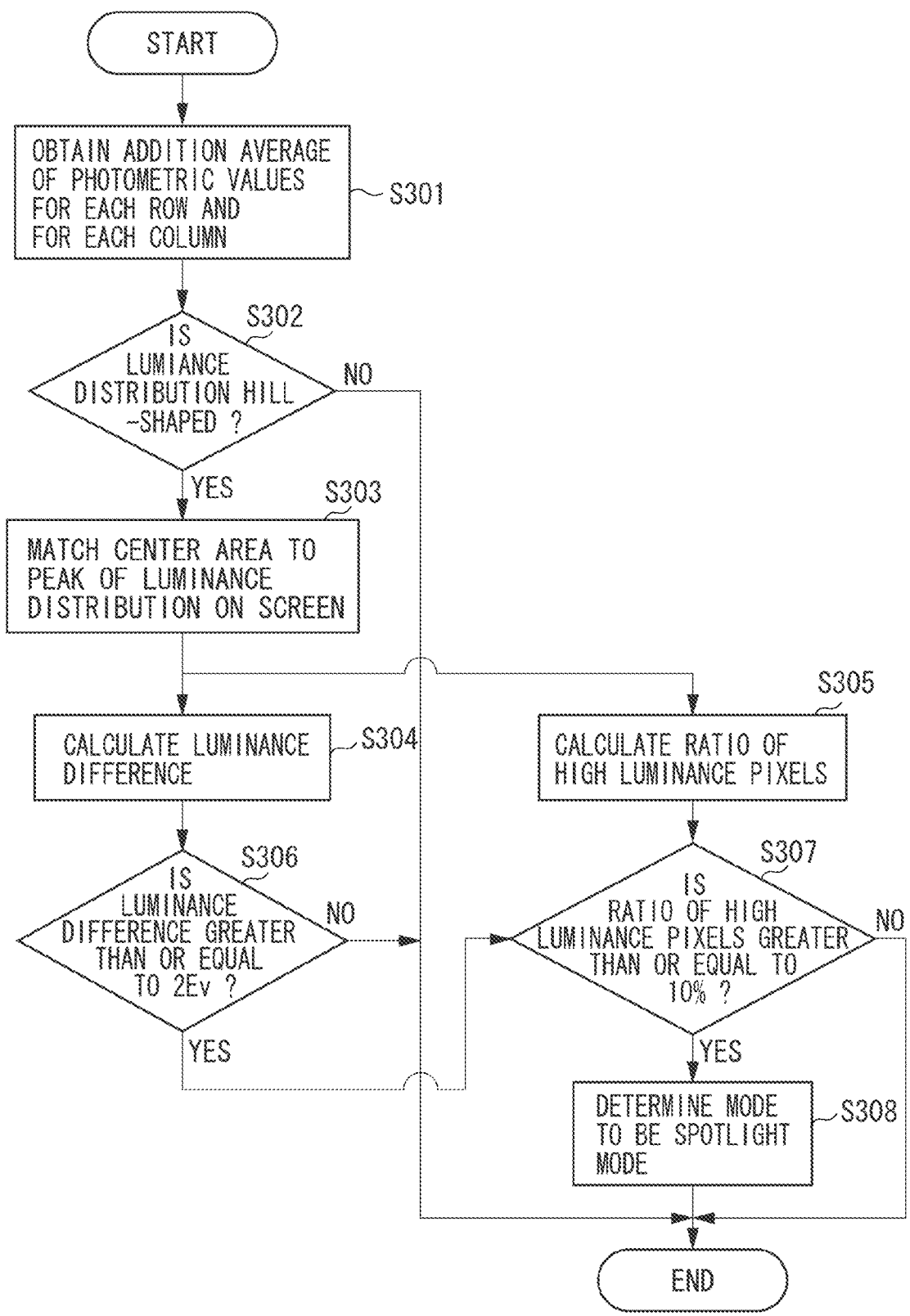

The above-described control process will be described below with reference to the flowcharts illustrated in FIGS. 6A and 6B. The flowchart of FIG. 6A illustrates a case where the position of the center frame of the screen is fixed, and the flowchart of FIG. 6B illustrates a case where the center position of the screen is changed using the result of the luminance distribution detection unit. The flowchart illustrated in FIG. 6A will be described below.

In step S201, the luminance distribution detection unit 281 calculates the addition averages of the rows and columns to detect the luminance distribution on the screen, and the process proceeds to step S202.

At the same time, in step S203, the luminance difference calculation unit 282 calculates the luminance difference between the center portion and the peripheral portion of the screen, and the process proceeds to step S204.

In parallel with the processes of step S201 and step S203, in step S205, the high luminance pixel ratio calculation unit 283 calculates the ratio of the high luminance pixels in the center portion of the screen, and the process then proceeds to step S206. In step 202, if the shape of the luminance distribution is hill-shaped (YES in step S202), the process proceeds to step S204. On the other hand, if the shape of the luminance distribution is not hill-shaped (NO in step S202), the process ends. In step 204, if the luminance difference between the center portion and the peripheral portion of the screen is greater than or equal to 2 Ev (YES in step S204), the process proceeds to step S206. If the luminance difference is less than 2 Ev (NO in step S202), the process ends. In step S206, if the ratio of the high luminance pixels in the center portion of the screen is greater than or equal to 10% (YES in step S206), the process proceeds to step S207. If the ratio of the high luminance pixels is less than 10% (NO in step S206), the process ends. In step S207, the spotlight determination unit 284 determines that the mode is the spotlight mode, and the process ends.

The order of calculations performed in step S201, step S203, and step S205 is not limited to the above, and the mode is determined as the spotlight mode when the results of each determination and calculation become "YES".

A case where the center position of the screen is changed depending on the result of the luminance distribution detection unit 281 which is different from the above-described process will be described below with reference to FIG. 6B.

In step S301, the luminance distribution detection unit 281 calculates the addition averages of the rows and columns to detect the luminance distribution on the screen, and the process proceeds to step S302. In step S302, if the shape of the luminance distribution is hill-shaped (YES in step S302), the process proceeds to step S303. On the other hand, if the shape of the luminance distribution is not hill-shaped (NO in step S302), the process ends. In step S303, the center frame is set centering on the mesh frame of the peak of the hill obtained by the detection performed in step S301. The process then proceeds to step S304 and step S305. In step S304, the luminance difference calculation unit 282 calculates the luminance difference between the center portion and the peripheral portion of the screen, and the process proceeds to step S306.

In parallel with the process of step S304, in step S306, the high luminance pixel ratio calculation unit 283 calculates the ratio of the high luminance pixels in the center portion of the screen, and the process proceeds to step S307. In step 306, if the luminance difference between the center portion and the peripheral portion of the screen is greater than or equal to 2 Ev (YES in step S306), the process proceeds to step S307. If the luminance difference is less than 2 Ev (NO in step S306), the process ends. In step S307, if the ratio of the high luminance pixels in the center portion of the screen is greater than or equal to 10% (YES in step S307), the process proceeds to step S308. If the ratio of the high luminance pixels is less than 10% (NO in step S307), the process ends. In step S308, the spotlight determination unit 284 determines that the mode is the spotlight mode, and the process ends.

The order of calculations performed in step S304 and step S306 is not limited to the above, and the mode is determined as the spotlight mode when each detection result and the calculation result become "YES".

After the scene is automatically determined to be the spotlight scene as described above, the exposure is controlled to adjust the maximum luminance portion in the screen to an appropriate exposure. As a result, for example, if a bride wearing a wedding dress is spotlighted in a wedding ceremony and is to be photographed, a photographer can photograph the main object which is almost overexposed, at an appropriate luminance. Further, since not only the bright portion in the screen is being viewed, a normal light metering can be performed in capturing the scenes other than the spotlight scene, so that the correct exposure can be realized according to the scene. Furthermore, since the scene is automatically detected, the photographer can concentrate on adjusting the angle of view without regard to the image capturing mode, so that a fine image can be captured without blur due to an operation, or without missing the object.

Other Exemplary Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recoding medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus which determines a scene of a captured image, the apparatus comprising:
    a first light metering unit configured to divide a screen of the captured image into a plurality of photometry areas and perform light metering;
    a second light metering unit configured to divide a screen of the captured image into one portion and a peripheral portion and perform light metering;
    a distribution detection unit configured to detect whether a luminance of the one portion is higher than a luminance of the peripheral portion, based on a result of adding photometric values of each of the photometry areas acquired by the first light metering unit by rows and by columns;
    a difference calculation unit configured to calculate a photometric value difference between the one portion and the peripheral portion acquired by the second light metering unit;
    a ratio calculation unit configured to calculate a ratio of area having a photometric value higher than or equal to a threshold value in the one portion measured by the second light metering unit; and
    a scene determination unit configured to determine whether a scene of the captured image is a spotlight scene according to a detection result of the distribution detection unit, calculation result of the difference calculation unit, and a calculation result of the ratio calculation unit.

2. An image processing apparatus according to claim 1, further comprising:
    an exposure control unit configured to control exposure based on light metering results of the first light metering unit and the second light metering unit, wherein the exposure control unit performs, when it is determined that a scene of a captured image is a spotlight scene, exposure control based on a photometric value of a photometric area of high luminance in a screen.

3. An image processing apparatus according to claim 1, wherein a position possessed by the one portion within an entire screen on which the second light metering unit performs light metering, is determined based on a result of the distribution detection unit.

4. An image processing method for determining a scene of a captured image, comprising:
    performing first light metering by dividing a screen of the captured image into a plurality of photometry areas and performing light metering;
    performing second light metering by dividing a screen of the captured image into one portion and a peripheral portion and performing light metering;
    detecting whether a luminance of the one portion is higher than a luminance of the peripheral portion, based on a result of adding photometric values of each of the photometry areas acquired by performing first light metering by rows and by columns;

calculating a difference between photometric value of the one portion and the peripheral portion thereof acquired by performing second light metering;

calculating a ratio of area having a photometric value higher than or equal to a threshold value in the one portion measured by performing second light metering; and determining whether a scene of the captured ~mage is a spotlight scene according to a result of detecting the distribution, calculating the difference, and calculating the ratio.

5. An image processing apparatus which determines a scene of a captured image, the apparatus comprising:

a first calculation unit configured to calculate a photometric value difference between one portion and a peripheral portion acquired by dividing a screen of the captured image into the one portion and the peripheral portion thereof;

a distribution detection unit configured to detect whether a luminance of the one portion is higher than a luminance of the peripheral portion, based on photometric values of each of the photometry areas acquired by dividing a screen of the captured image into a plurality of photometry areas;

a second calculation unit configured to calculate an area having a photometric value higher than or equal to a threshold value in the one portion of the screen; and a scene determination unit configured to determine whether a scene of the captured image is a spotlight scene according to a detection result of the distribution detection unit, calculation result of the first calculation unit, and a calculation result of the second calculation unit.

6. An image processing apparatus according to claim 5, further comprising:

an exposure control unit configured to control exposure based on a photometric value of a photometric area in a screen, wherein the exposure control unit performs, when it is determined that a scene of a captured image is a spotlight scene, exposure control based on a photometric value of a photometric area of high luminance in a screen.

7. An image processing method for determining a scene of a captured image, comprising:

calculating a difference between photometric value of one portion and a peripheral portion acquired by dividing a screen of the captured image into the one portion and the peripheral portion;

detecting whether a luminance of the one portion is higher than a luminance of the peripheral portion, based on photometric values of each of the photometry areas acquired by dividing a screen of the captured image into a plurality of photometry areas;

calculating area having a photometric value higher than or equal to a threshold value in the one portion of the screen; and determining whether a scene of the captured image is a spotlight scene according to a result of detecting the distribution, calculating the difference, and calculating area.

* * * * *